(12) United States Patent
Yedevelly et al.

(10) Patent No.: US 9,343,971 B2
(45) Date of Patent: May 17, 2016

(54) SYNCHRONOUS VCC GENERATOR FOR SWITCHING VOLTAGE REGULATOR

(75) Inventors: Yeshoda Yedevelly, Sunnyvale, CA (US); Pavel Konecny, San Jose, CA (US); Wayne T. Holcombe, Mountain View, CA (US)

(73) Assignee: Silicon Laboratories Inc., Austin, TX (US)

( * ) Notice: Subject to any disclaimer, the term of this patent is extended or adjusted under 35 U.S.C. 154(b) by 249 days.

(21) Appl. No.: 12/649,970

(22) Filed: Dec. 30, 2009

(65) Prior Publication Data

US 2011/0157941 A1 Jun. 30, 2011

(51) Int. Cl.
*H02M 3/335* (2006.01)
*H02M 1/00* (2006.01)

(52) U.S. Cl.
CPC .. *H02M 3/33507* (2013.01); *H02M 2001/0006* (2013.01)

(58) Field of Classification Search
CPC .............................. H02M 7/06; H02M 3/33507
USPC ............ 363/21.04, 21.08, 21.09, 21.1, 21.11, 363/21.12, 21.16, 21.17, 49; 323/284, 288, 323/901
See application file for complete search history.

(56) References Cited

U.S. PATENT DOCUMENTS

| 5,126,931 | A | * | 6/1992 | Jitaru ........................... 363/21.04 |
| 5,812,383 | A | * | 9/1998 | Majid et al. ................. 363/21.05 |
| 6,703,810 | B2 | * | 3/2004 | Peschke ........................ 320/128 |
| 7,202,654 | B1 | | 4/2007 | Dadashev et al. |
| 7,253,594 | B2 | * | 8/2007 | Paul et al. ...................... 323/268 |
| 7,339,804 | B2 | * | 3/2008 | Uchida .......................... 363/56.1 |
| 7,345,894 | B2 | * | 3/2008 | Sawtell et al. .............. 363/21.11 |
| 7,649,757 | B2 | * | 1/2010 | Lin ............................. 363/56.12 |
| RE42,334 | E | | 5/2011 | Miyagi |
| 7,952,895 | B2 | | 5/2011 | Matthews |
| 8,031,490 | B2 | * | 10/2011 | Kitamura et al. ........... 363/21.12 |
| 8,164,926 | B2 | * | 4/2012 | Schroeder genannt Berghegger ............... 363/21.12 |
| 2002/0163371 | A1 | * | 11/2002 | Hall et al. ...................... 327/175 |
| 2003/0001548 | A1 | * | 1/2003 | Feldtkeller .................... 323/225 |
| 2003/0035306 | A1 | * | 2/2003 | Matsumoto ................. 363/21.01 |
| 2007/0040516 | A1 | * | 2/2007 | Chen ............................. 315/291 |
| 2009/0140712 | A1 | | 6/2009 | Giombanco et al. |
| 2009/0295346 | A1 | | 12/2009 | Matthews |
| 2010/0309689 | A1 | * | 12/2010 | Coulson .......................... 363/16 |
| 2011/0013426 | A1 | * | 1/2011 | Keller ......................... 363/21.15 |
| 2011/0050308 | A1 | | 3/2011 | Huang et al. |
| 2011/0157919 | A1 | | 6/2011 | Yedevelly |

OTHER PUBLICATIONS

Office action dated Oct. 2, 2012 for U.S. Appl. No. 12/649,959, to Yedevelly.

* cited by examiner

*Primary Examiner* — Matthew Nguyen
*Assistant Examiner* — Kyle J Moody
(74) *Attorney, Agent, or Firm* — Abel Law Group, LLP

(57) ABSTRACT

A capacitor is charged synchronously with the beginning of an ON portion of a pulse width modulated (PWM) signal to generate a voltage across the capacitor using charging current sourced from an inductor on a primary side of a transformer. The voltage is supplied as a supply voltage to control circuitry in an integrated circuit used to generate the pulse width modulated signal. The charging is stopped when either the charging current goes above a predetermined charging current level or when the capacitor voltage goes above a predetermined capacitor voltage.

20 Claims, 11 Drawing Sheets

SYNCHRONOUS VCC GENERATOR FOR SWITCHING VOLTAGE REGULATOR

CROSS-REFERENCE TO RELATED APPLICATION(S)

This application relates to the application entitled "VCC Generator for Switching Regulator," naming Yeshoda Yedevelly and Pavel Konecny as inventors, application Ser. No. 12/649,959, which application was filed Dec. 30, 2009 the same day as the present application and is incorporated herein by reference in its entirety.

BACKGROUND

1. Field of the Invention

The present invention is directed to power conversion and more particularly to generation of VCC used in an integrated circuit forming part of the power conversion system.

2. Description of the Related Art

Switching voltage regulators are used to provide, e.g., regulated DC output voltage from an unregulated AC input. Typical consumer products involving such switching regulators include cell phone chargers, laptop or printer power supplies (so-called "bricks"), and embedded PC power supplies.

FIG. 1 illustrates switching regulator 100 having a topology commonly used in power supplies. The switching regulator includes high voltage isolation between the DC output (secondary side) and the AC input (primary side), which is required for safety/regulatory reasons and may also be required for functional reasons. The power is transferred from the primary side to the secondary side using a transformer 102 and primary side high voltage switch 104.

The switching regulator shown in FIG. 1 operates as follows. When the power MOSFET switch 104 turns ON (TON phase) according to the gate control signal supplied by the controller integrated circuit 106, the current through primary winding ramps up with a slope of Vin/Lp and the energy stored in the transformer core at the end of the TON cycle is proportional to $0.5*Lp*Ippeak^2$, where Lp is the transformer primary winding inductance and Ippeak is the primary winding peak current. The output current Is is zero during the TON phase and the voltage Vs is negative referenced to the secondary side ground, $Vs=-Ns*Vin$, where Ns is the transformer secondary/primary turn ratio.

When switch 104 turns OFF (TOFF phase), the primary inductor current Ip becomes zero and secondary current Is ramps down from the value Ispeak=Ippeak/Ns to zero, with a slope of approximately $\sim(Vout+Vdout)/Ls$. Accurate regulation of the output voltage requires feedback proportional to output voltage. The feedback controls the duty cycle of switch 104 in order to keep the output voltage constant over changing load and input voltage. The feedback path needs to cross the isolation barrier between the primary and secondary. A common feedback solution uses an opto-coupler 108 as shown in FIG. 1.

Another aspect shown in FIG. 1 is the use of an auxiliary winding 110 to provide the power supply VCC to the integrated circuit 106, which supplies the gate control signal for transistor 104.

SUMMARY

Accordingly, in one embodiment a method is provided that includes charging a capacitor during a beginning of an ON portion of a pulse width modulated signal to generate a voltage across the capacitor using charging current sourced from an inductor on a primary side of a transformer. The voltage is supplied as a supply voltage to control circuitry in an integrated circuit used to generate the pulse width modulated signal. That provides the advantage of removing the need to power the controller IC using an auxiliary winding.

In an embodiment, the method includes turning on a first transistor during the beginning of the ON portion to cause the current to flow through the inductor, through the first transistor, and charge the capacitor. The method may further include comparing the charging current to a threshold current level and stopping charging the capacitor if the charging current is above the threshold current level. The method may further include comparing the voltage across the capacitor to a high threshold and stopping charging the capacitor if the voltage is above the high threshold.

In another embodiment, a method of providing a supply voltage to an integrated circuit in a power conversion apparatus is provided that includes charging a capacitor in a first mode synchronously with a beginning of an ON portion of pulse width modulated (PWM) signal controlling current through an inductor on a primary side of a transformer in the power conversion apparatus, and providing a voltage across the capacitor as the supply voltage to the integrated circuit. The method may further include in a second mode, charging the capacitor asynchronously with the beginning of the ON portion of the PWM signal.

In another embodiment, an apparatus is provided that includes a capacitor to supply a voltage across the capacitor as a supply voltage to a control circuit portion of an integrated circuit coupled to receive the supply voltage and provide a pulse width modulated (PWM) signal having an ON portion and an OFF portion. The ON portion corresponds to when current is flowing through an inductor on a primary side of a transformer. The apparatus further includes a transistor having a first current carrying node coupled to the inductor and a second current carrying node coupled to the capacitor. Charge control logic controls the transistor to supply current from the second current carrying node to charge the capacitor synchronously with a beginning of ON portion of the PWM signal.

The apparatus may further include a compare circuit coupled to compare the voltage to a high voltage threshold and to generate a compare indication thereof. The charge control logic responds to the compare indication indicating that the voltage is above the high threshold to stop charging the capacitor during the beginning of the ON portion.

The apparatus may further include a compare circuit that provides an indication of a comparison of the charging current to a charging current threshold and generates a charging current compare indication. The charge control logic is responsive to the charging current compare indication that the charging current is above the charging current threshold to stop charging the capacitor during the beginning of the ON portion.

BRIEF DESCRIPTION OF THE DRAWINGS

The present invention may be better understood, and its numerous objects, features, and advantages made apparent to those skilled in the art by referencing the accompanying drawings.

The use of the same reference symbols in different drawings indicates similar or identical items.

DESCRIPTION OF THE PREFERRED EMBODIMENT(S)

Figure 1:
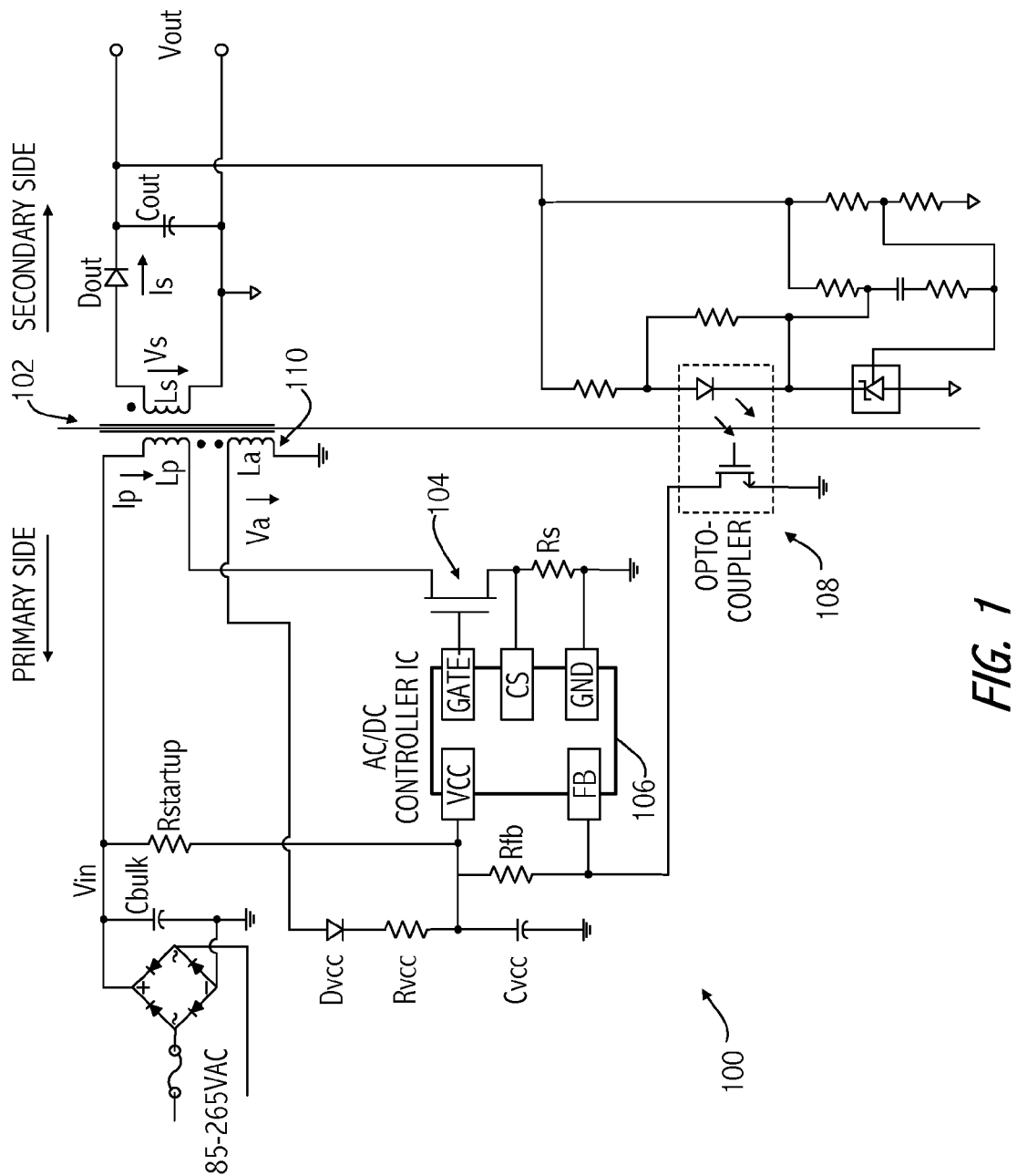
FIG. 1 illustrates a prior art switching regulator having a topology commonly used in power supplies.
Figure 2:
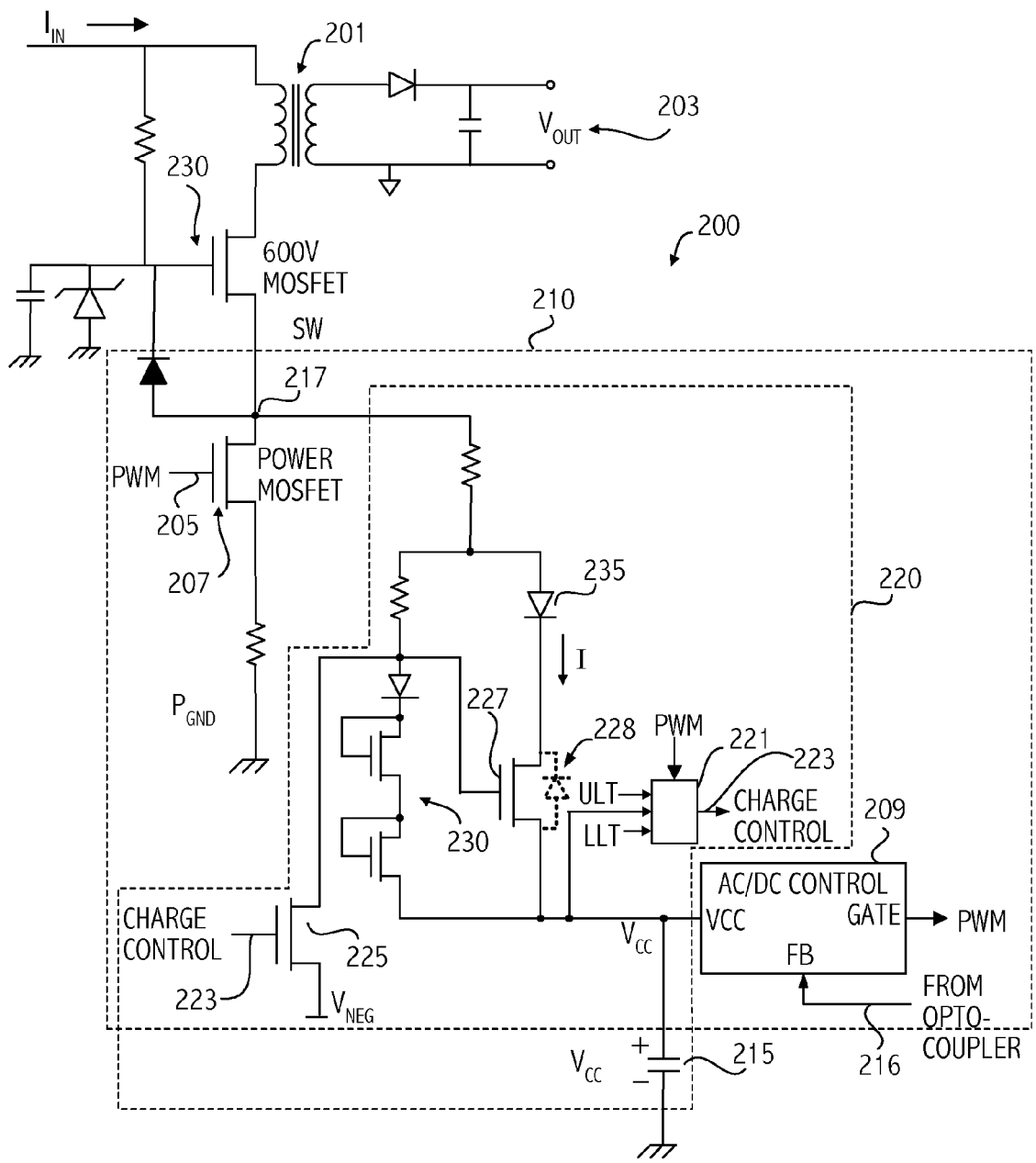
FIG. 2 illustrates a switching regulator according to an embodiment of the invention.

Referring to FIG. 2, illustrated is switching voltage regulator system 200 incorporating an embodiment of the invention. AC line current is supplied to transformer 201 with the energy being transferred to the secondary in a manner to supply a DC output voltage $V_{OUT}$ at 203. The current through the inductor is controlled by a pulse width modulated signal (PWM) to control transistor 207, shown as a MOSFET in the embodiment of FIG. 2. The PWM control signal 205 is generated by the circuitry 209 in a conventional manner and will not be described further herein. In the embodiment shown in FIG. 2, the functionality of the circuitry 209 corresponds to the control integrated circuit 106 in FIG. 1. The voltage across capacitor 215 provides the supply voltage used by the control circuits 209.

Figure 3:
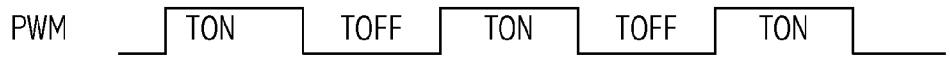
FIG. 3 illustrates an exemplary pulse width modulated (PWM) signal.

FIG. 3 shows an exemplary PWM control signal. In an embodiment of the invention, charging of capacitor 215 occurs only during the OFF period of the PWM signal. The ON and OFF widths of the PWM signal are adjusted by the control circuitry in 209 based on feedback 216 from the secondary side to maintain the output voltage at a desired level. Using the capacitor 215 to supply the power for control circuitry 209 as illustrated in FIG. 2 has the advantage of removing the need to power the controller IC using the extra auxiliary winding 110 in the transformer shown in FIG. 1.

Figure 4:
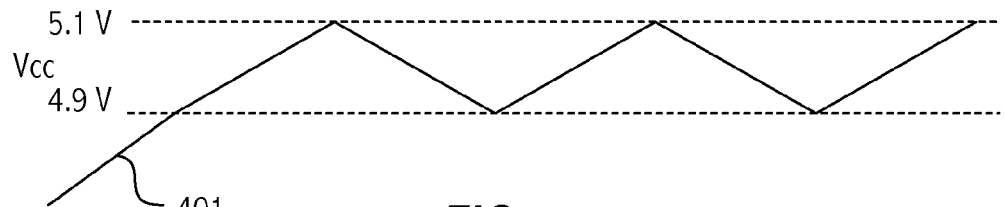
FIG. 4 illustrates a charging cycle for charging the capacitor supplying VCC.

FIG. 4 illustrates operation of the charging cycle. At initial startup, the capacitor 215 charges as shown at 401. Once charged to an appropriate level, the charging circuit maintains the charge on the capacitor between a high and low threshold, e.g., between 4.9 V and 5.1 V. The charging operation occurs during the OFF cycle of the PWM pulse. During the ON cycle, node 217 at the drain of transistor 207 is near ground causing the charging circuit 220 to be inactive. During the ON cycle, the capacitor supplies VCC to the control circuits 209, but the capacitor is not being charged. The power utilization by the control circuit 209 determines the discharge rate of the capacitor 215. Note that although not shown, VCC provided by the capacitor 215 also supplies the power for charge control circuit 221.

As indicated in FIG. 4, during the OFF period of the PWM pulse, the capacitor 215 is charged based on the VCC value. In an embodiment, charge control circuit 221 includes comparator circuits, which compares the VCC voltage to an upper limit (ULT) and a lower limit (LLT). If VCC is below the lower threshold, e.g., <4.9 V, the charge control signal 223 generated by charge control circuit 221 and supplied to transistor 225, is zero, causing transistor 225 to be off and causing the gate voltage on transistor 227 to be high enough to draw some current through the primary inductor of transformer 201. In one embodiment, the diodes 230 ensure that transistor 227 turns on "weakly" by limiting the gate voltage to limit the amount of charging current through transistor 227 to, e.g., 5-15 mA. The amount of current may be higher or lower depending, e.g., on the size of the capacitor 215, the amount of time available to charge the capacitor, and the power consumption of the control circuits 209. Rather than tens of mA, other embodiments may charge with hundreds of mA of current as described further herein.

If VCC is above an upper threshold, e.g., 5.1 V, then the charge control signal 223 is asserted (set to one in the embodiment illustrated) to turn on transistor 225 and force the gate of transistor 227 to a low level that turns off the transistor 227, which prevents current from flowing through the transistor to charge capacitor 215.

Note that effects of body diodes (only some of which are shown) that are associated with the transistors in the charging circuit should be considered. Accordingly, diode 235 ensures that the charge on capacitor 215 is not dissipated through transistor 225 through the path including the body diode 228 of transistor 227.

Note that in an embodiment of the invention, all the circuitry within the dashed line 210 are contained in an integrated circuit corresponding generally to the IC shown in FIG. 1. However, the switched voltage regulator is switched by switching at the source of the FET 230 through turning on and off transistor 207, rather than controlling the gate of FET 230 directly, as done in the switching regulator of FIG. 1.

Figure 5:
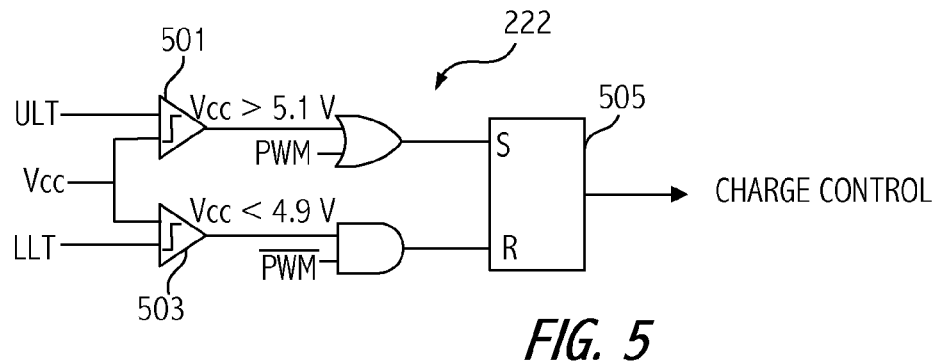
FIG. 5 illustrates an exemplary portion of a charging control circuit.

FIG. 5 illustrates an exemplary high level diagram of charge control logic 221. The charge control logic includes comparators 501 and 503, which compare the voltage VCC to the upper limit threshold (ULT) and the lower limit threshold (LLT), respectively. If VCC>ULT or the ON portion of the PWM signal is active, then the charge control signal 223 is set to "1" in the SR flip-flop 505 to disable transistor 227 by bringing the gate of transistor 227 close to ground by enabling transistor 225. If VCC<LLT during the OFF portion of the PWM signal, then the charge control signal is reset to enable charging of the capacitor. Using the SR flip-flop 505, charging is enabled between 4.9 V and 5.1 V, depending on whether the flip-flop was last set or reset. Note that the values for the upper and lower thresholds, 5.1 V and 4.9 V, respectively, are exemplary, and other voltage values may be used according to the needs of the system.

Figure 6:
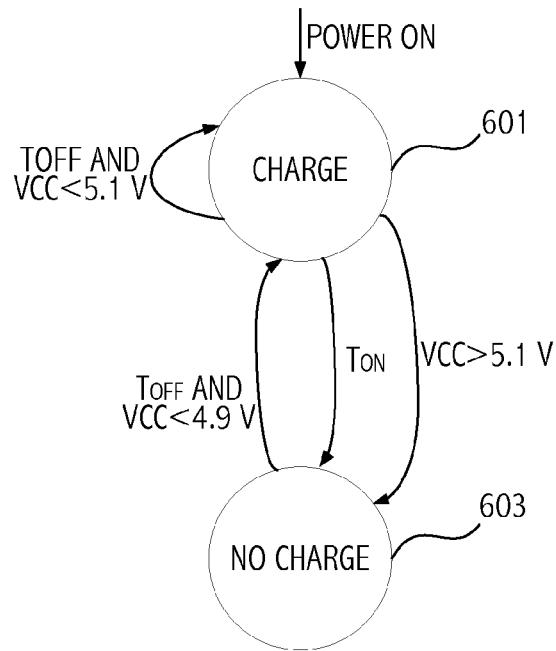
FIG. 6 illustrates a high level state diagram of operation of the charging control.

FIG. 6 illustrates an exemplary high level state diagram of the operation of exemplary charge control logic to control the charging of the capacitor. At power on, the control logic enables charging of the capacitor in state 601. Once the capacitor has been charged, the control logic enters the no charge state 603 when the ON portion of the PWM occurs or VCC>5.1 V. The control logic returns to the charge state 601 when both TOFF is true and the charge on the capacitor is less than 4.9V. Note that the power on condition may in fact be a separate state from the normal charge state 601. Note that during the ON portion of the PWM signal, the voltage at node 217 is close to ground, thereby ensuring current will not flow through transistor 227. Therefore, in some embodiments, the AND and NOR logic gates shown in FIG. 5 are not required.

Synchronous Mode

Figure 7:
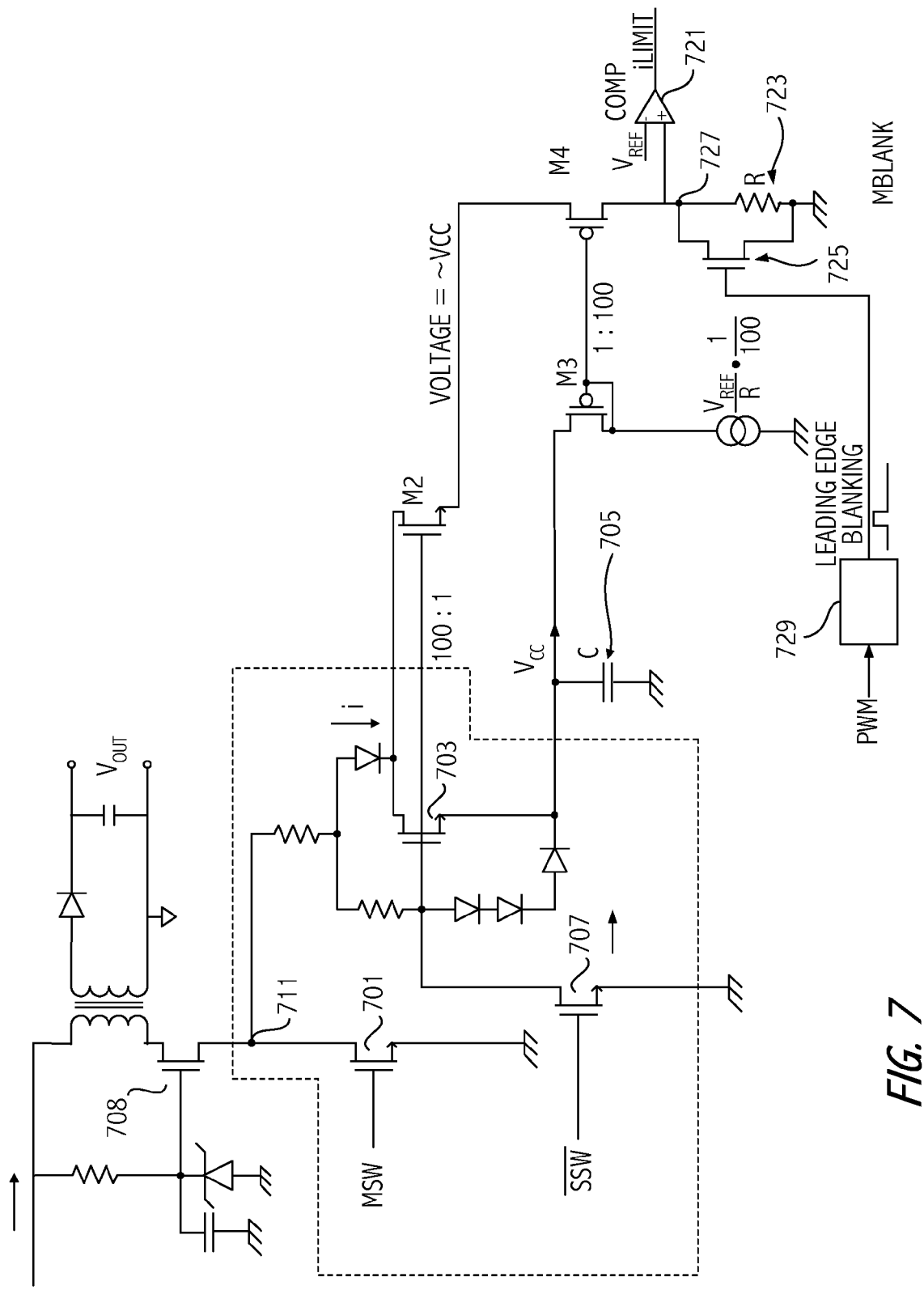
FIG. 7 illustrates a switching regulator according to another embodiment of the invention that includes a synchronous charging mode.

Referring to FIG. 7, in another embodiment, the power supply VCC for the logic portion of the integrated circuit is also generated using current from the main line. However, rather than being charged only during the OFF cycle of the PWM control signal, the charging occurs, at least some of the time, synchronously with the beginning of the ON cycle. Referring to FIGS. 7 and 8, the operation of charging according to this embodiment of the invention is illustrated. The PWM signal goes through its ON/OFF cycle as shown in FIG. 8. In a manner well known in the art, the respective widths of the ON and OFF periods determine the output voltage ($V_{OUT}$) generated by the switching AC-DC voltage regulator shown in FIG. 7.

The current L(I) through the inductor can be seen to ramp up from the beginning of the PWM ON portion through to the end of the ON portion. During the beginning of the ON portion, however, rather than turning on the main transistor 701 to carry the current flowing through the inductor, the transistor 703 turns on so that the current through transistor 703 charges the capacitor 705. Turning off transistor 707 turns on transistor 703, assuming that node 711 is at an appropriate voltage. In order to turn on 703, $\overline{SSW}$ is set to 0. As shown in FIG. 8, charging occurs synchronously with the beginning of the PWM ON portion.

Several conditions determine the end of the charging of the capacitor during the beginning of the PWM ON portion. For example, if the charging current reaches a predetermined upper current limit, e.g., 200-300 mA, charging is disabled. That is, transistor 703 turns off. In addition, if VCC>upper limit threshold (ULT), e.g., VCC>5.1 V, then charging also stops (transistor 703 turns off). Under either condition, when charging stops, the control signal MSW is enabled to turn on transistor 701. Thus, charging stops when either the upper current limit is reached or VCC is sufficiently charged. When either condition occurs, the current flowing through the inductor for the remainder of the ON portion of the PWM pulse is carried by the transistor 701. Note that the MSW signal is asserted as $\overline{SSW}$ is deasserted. It can be advantageous to turn on MSW before $\overline{SSW}$ is turned off. Doing so will avoid potential voltage spikes at nodes 711 (the drain of 701) and also at drain of 600V MOSFET 708. Such spikes would otherwise reduce efficiency. The diodes prevent reverse current flow from the VCC node through node 711 and transistor 701, so the overlap timing is not critical. Note that in the illustrated embodiment, the ULT at 5.1 V and LLT at 4.9 V provides a hysteresis of 0.2 V. Those particular values are exemplary and the values for VCC and hysteresis are dependent upon the requirement of the particular system incorporating one or more embodiments of the invention.

Figure 8A:
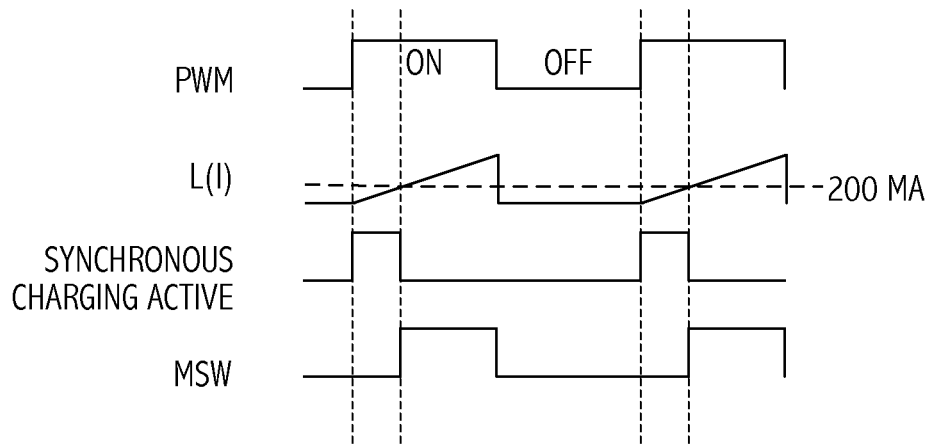
FIG. 8A illustrates a timing diagram illustrating the synchronous charging cycle of the capacitor with respect to the PWM signal for the embodiment of FIG. 7.
Figure 8B:
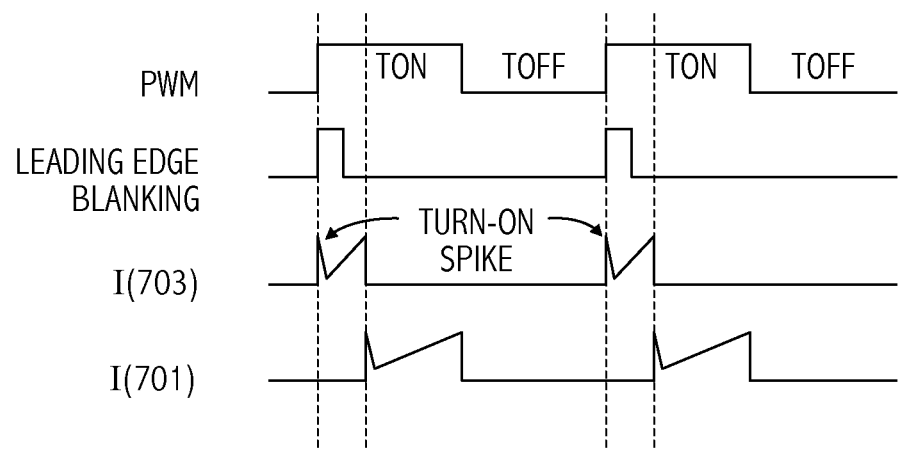
FIG. 8B illustrates a timing diagram associated with synchronous charging and current spikes for the embodiment of FIG. 7.

While FIG. 8a shows a simplified timing diagram of operation of the switching voltage regulator and charging cycle shown in FIG. 7, FIG. 8b shows additional aspects of the current waveforms showing current spikes that can occur when transistor 703 turns on. The current spikes are present due to capacitance at node 711 and also at the drain of 600V MOSFET 708, which is being discharged. The capacitances can be parasitic but in addition, real capacitors may be added to these nodes to slow down the turn on/off edges in order to mitigate EMI problems. Remember that one condition that indicates the end of the charging cycle is that the charging current reaches a predetermined upper current limit, e.g., 200-300 mA. If that limit is reached due to a current spike at the beginning of the PWM ON portion, sufficient VCC charging will not occur. FIG. 8B illustrates the current spikes for current through transistor 703 and through transistor 701 as well as leading edge blanking signal 805. Due to the current spikes, the current limit comparator 721 needs to be blanked for a time period in order avoid terminating charging of VCC because of initial current spike.

Referring back to FIG. 7, a current corresponding to the charging current is supplied to resistor 723. The voltage across 723, indicative of the charging current, is supplied to the comparator 721, which compares that voltage to a reference voltage. The reference voltage corresponds to the predetermined current threshold and supplies an iLIMIT signal indicating that the current limit has been reached. However, at the beginning of the charging cycle, a blanking signal shown in FIG. 8B and generated by edge detect circuit 729, is provided to transistor 725 to pull down node 727 for the blanking interval in order to ensure that the current limit indicator (iLIMIT) is not asserted due to the current spike. The blanking signal is coincident with the rising edge of TON as shown in FIG. 8B. The duration of the blanking signal has to be longer than the duration of the current spike and shorter than a possible time for the charging current to reach the current limit.

The synchronous mode is advantageous as compared to the asynchronous mode in that the energy stored in the primary inductor during VCC charging is transferred to the secondary, just like a power transfer current carried by transistor 701.

When VCC>the upper threshold, e.g., 5.1 V, charging in both the synchronous and the asynchronous mode is disabled. The condition of VCC<the lower threshold, e.g., 4.9 V, enables charging in synchronous and asynchronous mode, assuming other conditions allow it, e.g., depending on the state of the PWM signal. However, in synchronous mode, the capacitor charges at the beginning of the PWM ON portion and in asynchronous mode, the capacitor charges during the OFF portion.

Figure 9:
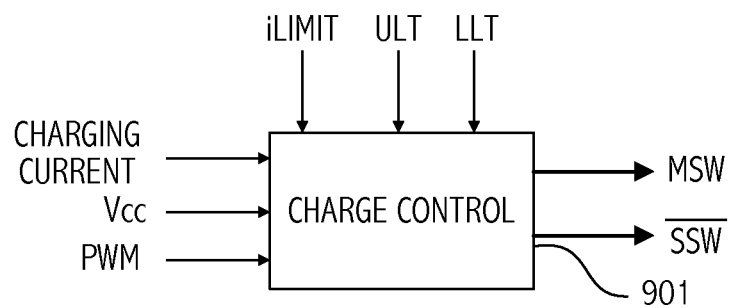
FIG. 9 illustrates the inputs and outputs for a control circuit for controlling charging aspects of the embodiment shown in FIG. 7

Referring to FIG. 9, the input and output signals for an exemplary charge control circuit for the embodiment shown in FIGS. 7 and 8 is illustrated. The charge control circuit 901 includes as input signals the charging current, the voltage VCC, the PWM signal, the current limit (iLIMIT) and the upper limit (ULT) and lower limit (LLT) thresholds. The charge control signal supplies the MSW signal and the $\overline{SSW}$ signal. The rising and falling edges of the $\overline{SSW}$ signal are determined as follows. When VCC>ULT, in synchronous mode, the positive edge of $\overline{SSW}$ is defined by the positive edge of the PWM signal. Note that the $\overline{SSW}$ signal is asserted during the OFF phase of PWM to ensure transistor 703 is off during synchronous operation.

When VCC<LLT indicating that charging is required, the negative edge of $\overline{SSW}$ is defined by the positive edge of the PWM signal. The positive edge of $\overline{SSW}$ can be generated anytime between the assertion and deassertion of the MSW signal.

Figure 10:
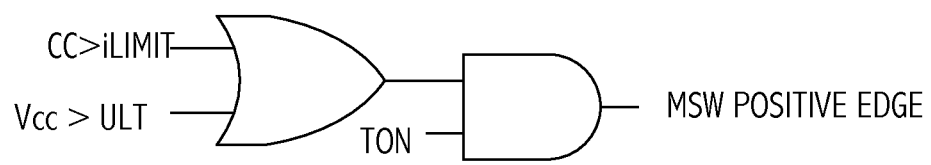
FIG. 10 illustrates a portion of the control logic for the embodiment illustrated in FIG. 7.

FIG. 10 illustrates generation of the positive edge of the MSW signal at the end of the synchronous charging period. The end of the synchronous charging period and therefore the beginning of MSW is determined by either the charging current being above the current threshold (iLIMIT), e.g., 200 mA, or VCC>ULT during TON. Other values for current threshold may of course be utilized according to such factors as the size of the capacitor, the time allowed to charge the capacitor, and the load in VCC. The negative edge of the MSW signal is generated by the negative edge of the PWM signal as shown in FIG. 7.

Figure 11:
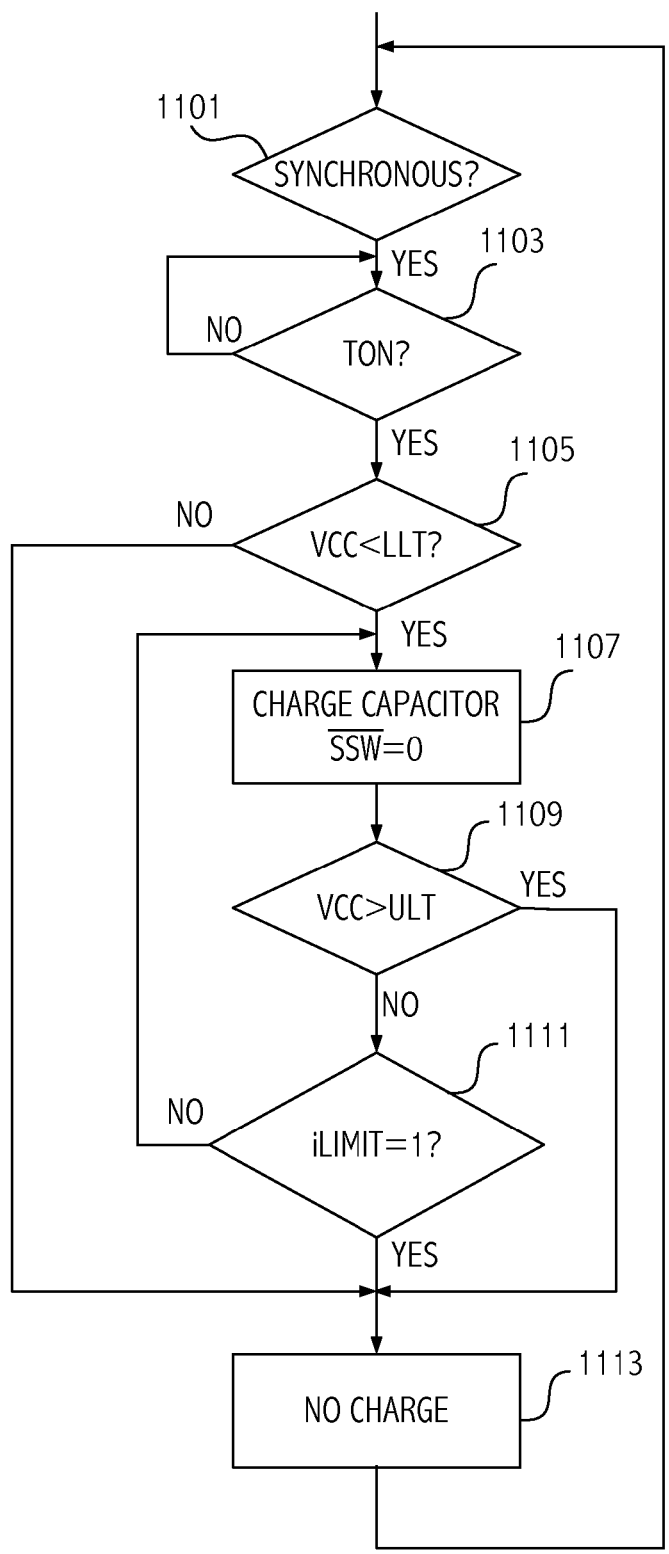
FIG. 11 illustrates a high level flow diagram for controlling charging of the capacitor in the embodiment shown in FIGS. 7 and 8.
Figure 12:
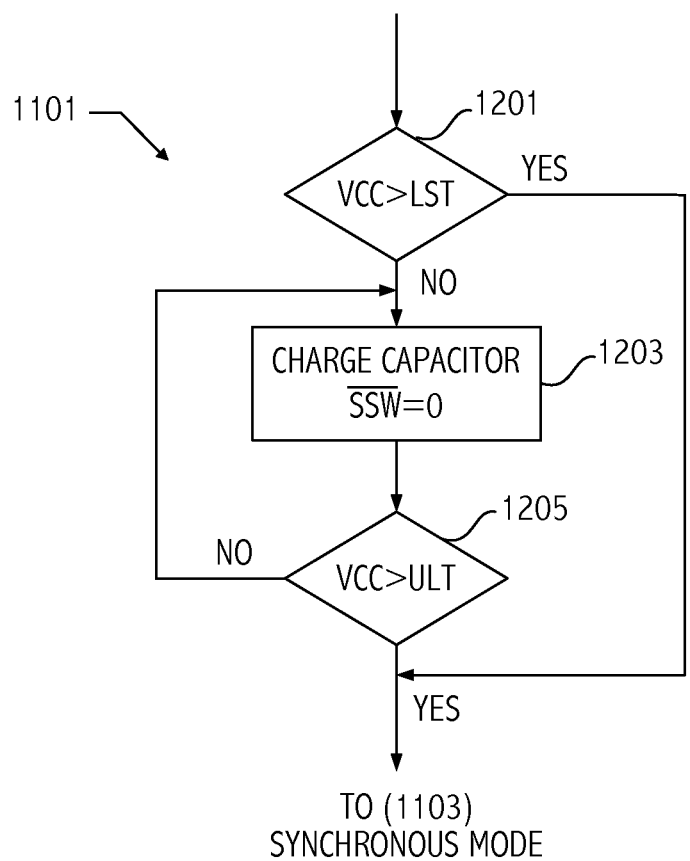
FIG. 12 illustrates an exemplary embodiment for determining whether to enter asynchronous mode.

Referring to FIG. 11, a high level simplified flow diagram of the control logic for charge control circuit 901 is illustrated. In an embodiment, the charge control circuit 901 includes the comparators and SR flip-flop shown in FIG. 5. In addition, the charge control circuit also includes the necessary logic to determine the appropriate rising and falling edges of the control signals MSW and $\overline{SSW}$. The charge control circuit 901 may also include the charging current compare circuit to determine if the charging current is above the current threshold limit shown in FIG. 7. In other embodiments, the ULT and LLT comparators and current threshold circuit may be external to the control circuit 901. In FIG. 11 at 1101, a determination is made as to whether synchronous mode is active. One embodiment for determining if synchronous mode is active is illustrated in FIG. 12, which is described further herein. Assuming that synchronous mode is active, if TON is true in 1103 and VCC<LLT in 1105, then the capacitor charges in 1107. In 1109, a check is made as to whether VCC>ULT. If so, charging is stopped. If not, a check is made as to whether the charging current (CC) is greater than the charging current limit (iLIMIT) in 1111. If so, charging stops in 1113. If not, charging continues in 1107 until either VCC>ULT in 1009 or the iLIMIT signal is asserted indicating that the charging current limit has been reached. In the embodiment illustrated in FIG. 11, charging occurs at the beginning of TON when VCC is less than the LLT. In other embodiments, charging may occur when VCC<5.1 but VCC>4.9V.

Note that when the transistor 701 turns on when MSW is asserted, transistor 703 is turned off, as the resistance through transistor 701 is so small that node 711 is much lower than the VCC voltage, and therefore transistor 703 is not conducting current. The diodes in the VCC charging circuit prevent current flow from the VCC capacitor 605 to ground through the path through transistor 601.

The voltage on the VCC capacitor is controlled in two modes so that the voltage does not cross the process maximum and minimum voltage. In the first synchronous mode, just described, $\overline{SSW}$, and therefore charging, is controlled so as to be synchronous with PWM, thus providing fixed frequency charging based on the frequency of the PWM signal. In a second mode, the deassertion of $\overline{SSW}$ to turn on transistor 703 and thus charge capacitor 705, is asynchronous with PWM and MSW. The asynchronous mode operates in the manner described with relation to FIG. 2. Thus, charging occurs during the OFF portion of the PWM pulse. Note that the PWM pulse can be off for several reasons.

One such asynchronous condition is at startup of the switching voltage regulator. At startup, $\overline{SSW}$ is set to 0 to cause transistor 707 to be off to thereby cause transistor 703 to turn on to charge the capacitor 705. The rate of charging of the capacitor, is defined by the amount of current through transistor 703, which is determined by the transconductance (gm) of the transistor 703 and the Vgs (set by diodes) of the transistor 703. Once the voltage across the capacitor (VCC) reaches the power-on active threshold, e.g., 5.1 V, the functionality of the charging controller is started to charge the capacitor synchronously with PWM and based on the high and low threshold voltages and the upper current limit.

Asynchronous mode may also be required during pulse skipping. During pulse skipping, certain of the ON pulses are skipped. That limits the opportunities to charge the VCC capacitor. So during pulse skipping (which is hysteretic), depending on the TON and TOFF timing, synchronous mode may be incapable of delivering sufficient charge. Under such circumstances, charging of the VCC capacitor has to switch from synchronous to asynchronous mode. During asynchronous mode, in an embodiment, the negative edge of $\overline{SSW}$ is generated by VCC<4.8 V and the positive edge by VCC>5.1V. Depending on the need for charge, the VCC generator circuitry turns on asynchronously during the OFF period. Note that in some synchronous embodiments that utilize the asynchronous mode when necessary, LLT and LST may differ. For example, LLT may be a little higher than LST, a little lower than LST or they may be the same, according to the requirements of the particular system.

Referring to FIG. 12, an exemplary embodiment for determining whether to enter asynchronous mode is illustrated. The particular embodiment works for both start-up and pulse skipping situations. In 1201 VCC is compared to Lower Synchronous Threshold (LST), which in an exemplary embodiment is 4.8V. If VCC is >LST, then synchronous mode is entered. If, however, VCC is determined not to be greater than LST, the capacitor is charged in 1203 until VCC>Upper Synchronous Threshold (UST). In an embodiment the UST=ULT=5.1V. In other embodiments, they may differ.

Figure 13:
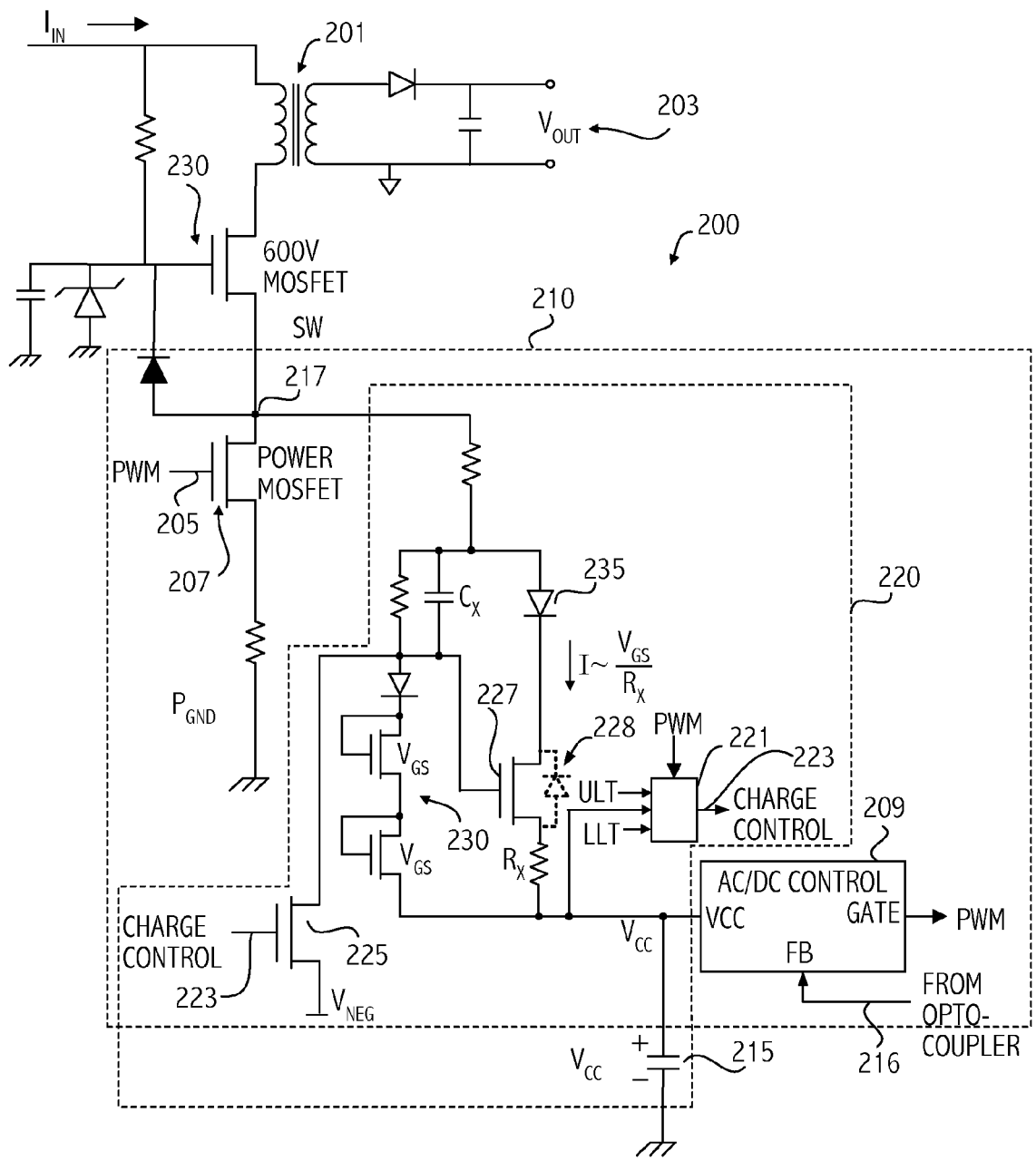
FIG. 13 illustrates a switching regulator according to another embodiment of the invention.

Referring to FIG. 13 a switching voltage regulator embodiment is illustrated in which in which Cx and Rx have been added to the embodiment illustrated in FIG. 2. The resistor Rx makes the VCC charging current less variable over process and temperature. The charging current Ivcc~Vgs/Rx. The capacitor Cx helps to turn-on transistor 227 faster.

Figure 14:
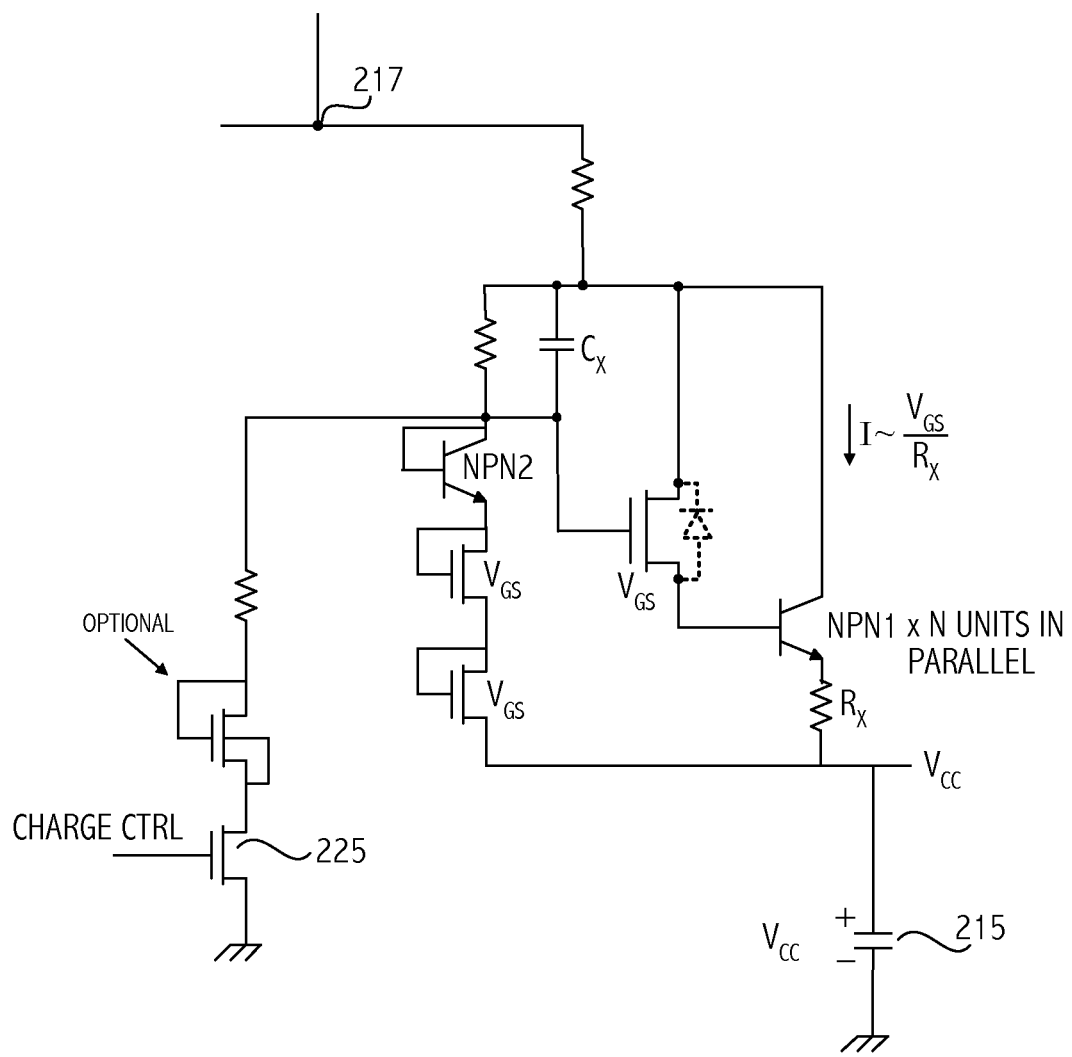
FIG. 14 illustrates a charging circuit portion of a switching regulator according to another embodiment of the invention.

Referring to FIG. 14, another embodiment of the charging circuit is illustrated that is suited for asynchronous (lower current) embodiments and tolerates higher NPN collector resistance by off-setting collector voltage above the base voltage. The resistor Rx and capacitor Cx may also optionally be used in this embodiment.

Figure 15:
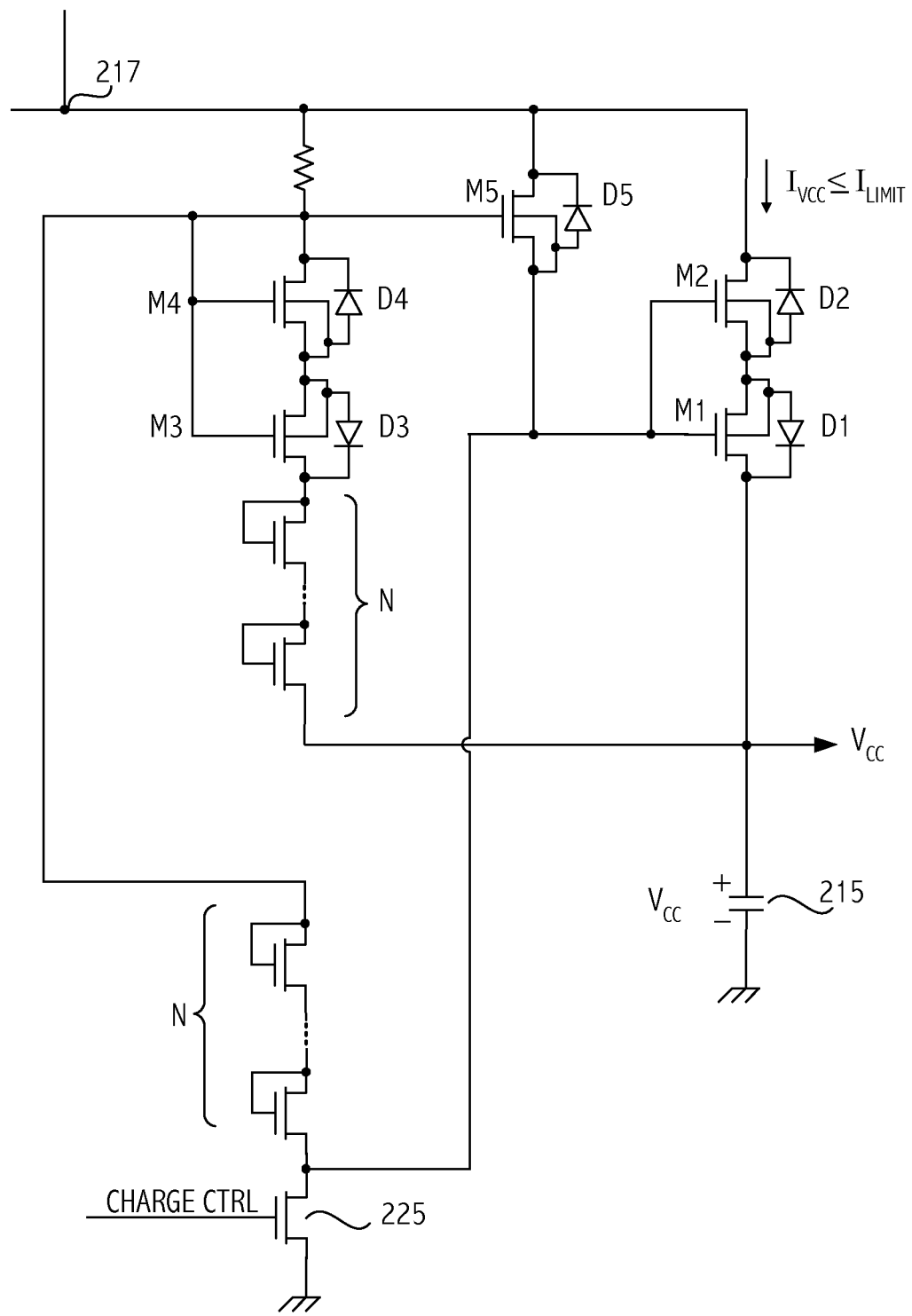
FIG. 15 illustrates charging circuit portion of a switching regulator according to another embodiment of the invention.

Referring to FIG. 15 another embodiment is illustrated that is suitable for synchronous higher current embodiments. In the illustrated embodiment, the reverse current is blocked by connecting pairs M1-M2 and M3-M4 with their sources together so that parasitic body diodes are in anti-series. When the charging current Ivcc is flowing it creates voltage drop Ron_M1*Ivcc where Ron_M1 is the on resistance of transistor M1 and if this voltage drop is more than D1 ON voltage then substrate current will be generated thereby decreasing efficiency. That means M1 should have an on resistance several times lower than M2 so that most of the voltage drop is on transistor M2. For example, Ron_M1*Ilimit<0.4V to keep D1 always off. The same is true for M3-M4 pair, but their very small currents make it easy to fulfill the same condition. Transistor M5 helps to speed-up the turn-on time of M1-M2 (charging the gates faster), because for the synchronous version M1 and M2 currents are very big (several hundreds mAs) and the resistance between gate-drain of M5 should be large to reduce DC leakage. The diodes D1, D2, D3, D4, and D5 are parasitic diodes in the illustrated embodiment.

The description of the invention set forth herein is illustrative, and is not intended to limit the scope of the invention as set forth in the following claims. Variations and modifications of the embodiments disclosed herein may be made based on the description set forth herein, without departing from the scope of the invention as set forth in the following claims.

What is claimed is:
1. A method comprising:
 charging a capacitor during a beginning of an ON portion of a pulse width modulated signal to generate a voltage across the capacitor using charging current sourced from a primary inductor on a primary side of a transformer;

supplying the voltage as a supply voltage to control circuitry in an integrated circuit used to generate the pulse width modulated signal;
turning on a first transistor during the beginning of the ON portion to cause the charging current to flow through the primary inductor, through the first transistor, and charge the capacitor;
turning on a second transistor during a second portion of the ON portion after the beginning and before an OFF portion of the pulse width modulated signal to cause current to flow through the primary inductor and to flow through the second transistor; and
turning off the first transistor during the second portion to stop charging the capacitor.

2. A method comprising:
causing current to flow, for sequential periods of a pulse width modulated control signal for a switching regulator having an ON portion and an OFF portion, through a primary winding of a transformer during the ON portion to store energy in the transformer;
during a first portion of the ON portion, the first portion being at a beginning of the ON portion, turning on a first transistor to supply the current from the primary winding through the first transistor as a charging current to a capacitor to charge the capacitor and turning off the first transistor to stop charging the capacitor during a second portion of the ON portion;
during the second portion of the ON portion supplying the current from the primary winding to a ground node through a second transistor; and
supplying voltage across the capacitor resulting from the charging current to control circuitry in an integrated circuit used to generate the pulse width modulated control signal.

3. The method as recited in claim 2 further comprising:
comparing the charging current to a threshold current level; and
stopping charging the capacitor if the charging current is above the threshold current level.

4. The method as recited in claim 3 wherein the comparing comprises:
comparing a voltage indicative of the charging current to a reference voltage in a comparator; and
forcing the voltage indicative of the charging current to a low value during an initial portion of the beginning of the ON portion to keep current spikes during the initial portion from triggering an indication in the comparator that the charging current is above the threshold current level.

5. The method as recited in claim 2 further comprising:
comparing the voltage across the capacitor to a high threshold; and
stopping charging the capacitor if the voltage is above the high threshold.

6. The method as recited in claim 5 further comprising charging the capacitor when the voltage is below a low threshold during the beginning of the ON portion.

7. The method as recited in claim 2 further comprising providing control functionality for an AC-DC converter in the integrated circuit.

8. The method as recited in claim 2 further comprising controlling the first transistor so as to limit the charging current to approximately several hundred mA.

9. A method of providing a supply voltage to an integrated circuit in a power conversion apparatus comprising:
charging a capacitor in a first mode in consecutive ON portions of a pulse width modulated (PWM) signal using current from a primary inductor on a primary side of a transformer in the power conversion apparatus, the current being supplied to the capacitor through a first transistor controlled to be on or off according to a control signal based in part on the PWM signal, the charging being synchronous with a beginning of each of the consecutive ON portions of the pulse width modulated (PWM) signal controlling the current;
stopping charging of the capacitor during the ON portions of the PWM signal; and
providing a voltage across the capacitor as the supply voltage to the integrated circuit.

10. The method as recited in claim 9 further comprising:
in a second mode charging the capacitor with current from the primary inductor asynchronously with the beginning of the ON portions of the PWM signal.

11. The method as recited in claim 10 wherein the second mode is used during a power on sequence.

12. The method as recited in claim 10 wherein the second mode is used if the voltage across the capacitor is less than a low threshold voltage.

13. The method as recited in claim 10 wherein the second mode is used during pulse skipping of the PWM signal in which one or more ON portions of the PWM signal are skipped.

14. A method of providing a supply voltage to an integrated circuit in a power conversion apparatus comprising:
charging a capacitor in a first mode in consecutive ON portions of a pulse width modulated (PWM) signal using current from a primary inductor on a primary side of a transformer in the power conversion apparatus, the current being supplied to the capacitor through a first transistor controlled to be on or off according to a control signal based in part on the PWM signal, the charging being synchronous with a beginning of each of the consecutive ON portions of the pulse width modulated (PWM) signal controlling the current;
providing a voltage across the capacitor as the supply voltage to the integrated circuit; and
in a second mode charging the capacitor with current from the primary inductor asynchronously with the beginning of the ON portions of the PWM signal;
wherein in the second mode, the capacitor is charged during OFF portions of the PWM signal.

15. An apparatus comprising:
a capacitor to supply a voltage across the capacitor as a supply voltage;
a control circuit portion of an integrated circuit coupled to receive the supply voltage and provide a pulse width modulated (PWM) signal having an ON portion and an OFF portion;
a first transistor having a first current carrying node coupled to a primary inductor and a second current carrying node coupled to the capacitor;
charge control logic coupled to control the first transistor to supply charging current from the second current carrying node to begin charging of the capacitor with current sourced from the primary inductor synchronously with a beginning of consecutive ON portions of the PWM signal; and
a second transistor coupled to the primary inductor, the second transistor being disabled at the beginning of the ON portions and enabled after the beginning of the ON portions, thereby allowing current to flow through the primary inductor and the second transistor after the charging of the capacitor is stopped;

wherein the charge control logic is responsive to at least one of the charging current being above a current threshold or the voltage being greater than a voltage threshold, to control the first transistor to stop charging the capacitor through the first transistor and to enable the second transistor.

16. The apparatus as recited in claim 15 further comprising:
a compare circuit coupled to compare the voltage to the voltage threshold and to generate a compare indication thereof;
wherein the charge control logic is responsive to the compare indication indicating that the voltage is above the voltage threshold to stop the charging of the capacitor.

17. The apparatus as recited in claim 15 further comprising:
a compare circuit coupled to provide an indication of a comparison of the charging current to the current threshold;
wherein the charge control logic is responsive to the indication indicating that the charging current is above the current threshold to stop the charging of the capacitor.

18. The apparatus as recited in claim 15 wherein the capacitor is charged asynchronously with the beginning of the ON portion in an asynchronous charging mode.

19. The apparatus as recited in claim 18 wherein the asynchronous charging mode is utilized during startup.

20. The apparatus as recited in claim 18 wherein the asynchronous charging mode is utilized when the voltage of the capacitor is below a predetermined threshold.

* * * * *